April 7, 1925.
D. J. PEELER
1,532,937
PISTON FOR INTERNAL COMBUSTION MOTORS
Filed June 3, 1922
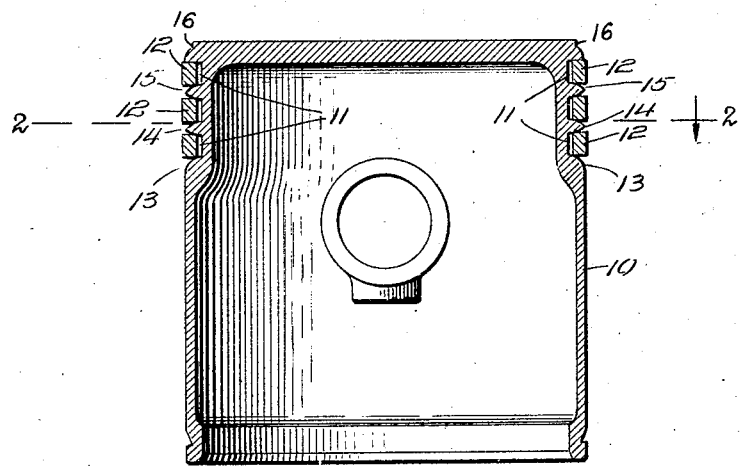
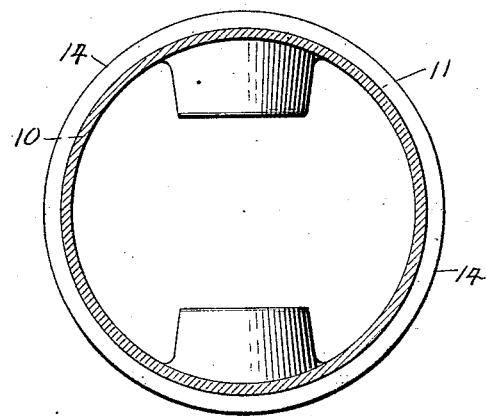
D. J. Peeler, INVENTOR.
BY Geo. T. Kimmel, ATTORNEY.

Patented Apr. 7, 1925.

1,532,937

UNITED STATES PATENT OFFICE.

DOCK J. PEELER, OF NASHVILLE, TENNESSEE.

PISTON FOR INTERNAL-COMBUSTION MOTORS.

Application filed June 3, 1922. Serial No. 565,697.

*To all whom it may concern:*

Be it known that I, DOCK J. PEELER, a citizen of the United States, residing at Nashville, in the county of Davidson and State of Tennessee, have invented certain new and useful Improvements in Pistons for Internal-Combustion Motors, of which the following is a specification.

This invention relates to the piston heads of motors, more particularly to the piston heads of internal combustion motors, or to devices of this character in which an explosion chamber is located at one side of the piston and an oil chamber at the opposite side, and in which the connecting rod and crank constantly operate in the oil, and has for one of its objects to so form the piston that it will draw a portion of the oil from the oil chamber and distribute it uniformly upon the interior of the cylinder at the stroke away from the oil chamber, and scrape the surplus oil from the inner face of the cylinder and return it to the oil chamber at the return stroke, thus preventing oil from passing to the combustion chamber, and preventing the piston from pumping air at either the upward or downward stroke.

With these and other objects in view the invention consists in certain novel features of construction as hereinafter shown and described and then specifically pointed out in the claims, and in the drawings illustrative of the preferred embodiment of the invention:—

Fig. 1 is a vertical section of a piston head with the improvement applied,

Fig. 2 is a transverse section on the line 2—2 of Fig. 1.

The improved piston is represented as a whole at 10 and includes a plurality of encompassing grooves or channels 11 in spaced relation to receive the packing rings indicated at 12.

The upper and lower faces of the "lands" or portions 14 and 15 between the grooves are reversely curved or rounded as shown in Fig. 1 to form V shaped spaces entirely surrounding the piston between the packing rings 12 and the body of the piston.

By this simple arrangement when the piston is moved toward the combustion chamber end and away from the oil chamber, a portion of the oil will be drawn upward by the suction of the piston and instantly fill the V shaped spaces formed by the curved or rounded faces of the "lands," and any leakage of oil which passes the lower ring 12 will enter the second space formed by the curved or rounded faces 14, and any further leakage will enter the next space formed by the rounded or curved faces 15.

This action distributes the oil thus drawn upward in a uniformly thin film over the whole interior of the cylinder. At the return stroke of the piston the closely fitting packing ring 12 scrapes the film of oil from the interior of the cylinder and returns it to the oil chamber, thus preventing oil passing into the combustion chamber.

By this simple means the tendency to deposit carbon within the cylinder is materially reduced, and the smoother running of the motor insured and with increased compression.

The oil is picked up by the connecting rod and thrown against the piston and cylinder walls many times per minute, filling the V shaped grooves around the rings, these grooves remaining full of oil will prevent a thin sheet of oil from passing under the rings to the combustion chamber.

The drop or notch at 16, at the head of the piston being square or vertical prevents any moisture from getting to the head of the piston, thereby assuring a clean mixture in the combustion chamber which means more power and clean spark plugs. The V shaped grooves being kept full of oil prevents carbon from forming under the rings, leaving the rings free to do their work.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is: —

A piston including a cylindrical body having spaced encompassing channels with the side walls of the lands between the channels uniformly reduced in curved lines toward the outer faces thereof, and a packing ring engaging in each of the channels, the packing rings being rectangular transversely with the side faces in parallel relation, the spaces between the rings and lands uniformly increasing in area outwardly, to receive the lubricant and prevent it from being carried past the rings at both the upward and downward stroke of the piston or from pumping air past the piston.

In testimony whereof, I affix my signature hereto.

DOCK J. PEELER.